Figure 1:
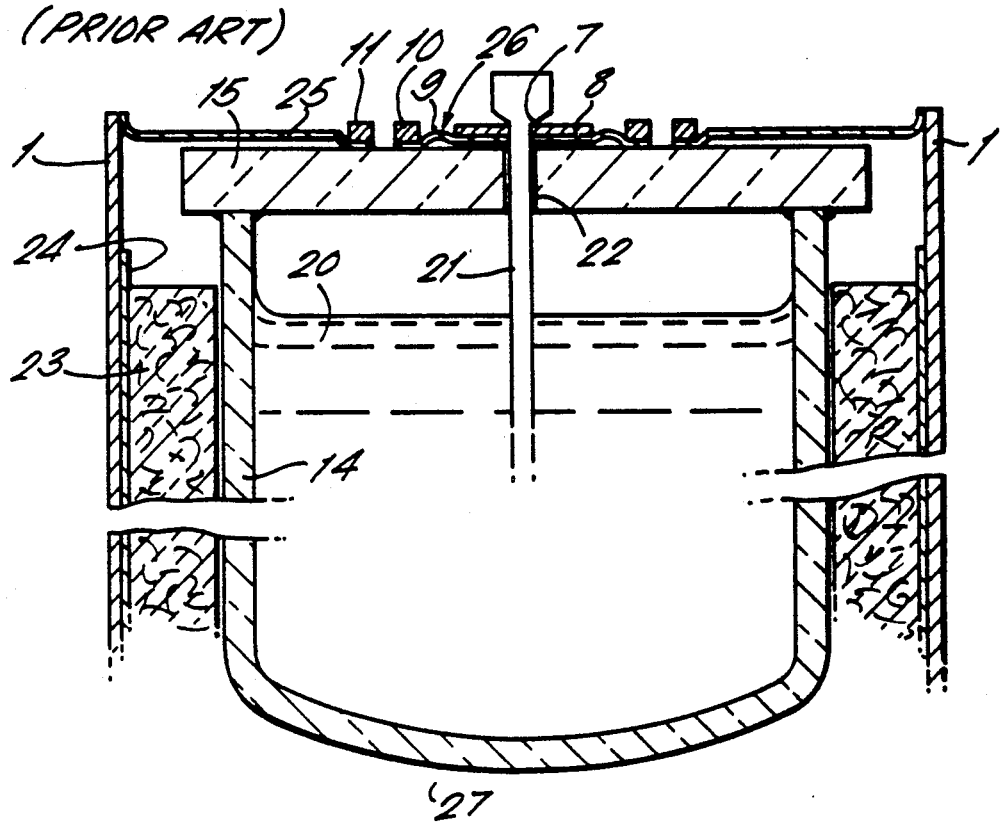

United States Patent [19]
Bindin, Peter J. et al.

[11] Patent Number: 5,118,574
[45] Date of Patent: Jun. 2, 1992

[54] ALKALI METAL ENERGY CONVERSION DEVICE AND METHOD OF CONSTRUCTION

[75] Inventors: Bindin, Peter J., Runcorn; Stuart McLachlan, Northwhich; Christopher O'Neil Bell, Warrington; Gilbert Sands; Roger A. Ball, both of Northwhich, all of Great Britain

[73] Assignee: Chloride Silent Power Limited, Runcorn, United Kingdom

[21] Appl. No.: 469,428

[22] PCT Filed: Oct. 24, 1988

[86] PCT No.: PCT/GB88/00909
§ 371 Date: Jun. 8, 1990
§ 102(e) Date: Jun. 8, 1990

[87] PCT Pub. No.: WO89/04068
PCT Pub. Date: May 5, 1989

[30] Foreign Application Priority Data
Oct. 23, 1987 [GB] United Kingdom ............... 8724816

[51] Int. Cl.⁵ .................................. H01M 10/39
[52] U.S. Cl. .................................. 429/104; 29/623.2
[58] Field of Search ............ 429/104; 29/623.1, 623.2

[56] References Cited
U.S. PATENT DOCUMENTS

| | | | |
|---|---|---|---|
| 3,939,007 | 2/1976 | Sudworth et al. | 429/104 X |
| 4,473,624 | 9/1984 | Hug et al. | 429/104 |
| 4,564,568 | 11/1984 | Hasenauer et al. | |
| 4,590,136 | 4/1985 | Buehler et al. | |
| 4,638,555 | 1/1987 | MacLachlan et al. | 429/104 X |
| 4,759,999 | 7/1988 | MacLachlan et al. | 429/104 |
| 4,772,293 | 9/1988 | Bugden et al. | 429/104 X |
| 4,956,246 | 9/1990 | Kamuf et al. | 429/104 |

FOREIGN PATENT DOCUMENTS

| | | |
|---|---|---|
| 64656 | 11/1982 | European Pat. Off. |
| 142030 | 5/1985 | European Pat. Off. |
| 158815 | 10/1985 | European Pat. Off. |
| 166605 | 1/1986 | European Pat. Off. |
| 3345708 | 6/1985 | Fed. Rep. of Germany |
| 2568413 | 1/1986 | France |
| 1502693 | 3/1978 | United Kingdom |
| 2083686 | 3/1982 | United Kingdom |
| 2127615 | 4/1984 | United Kingdom |
| 2162680A | 7/1985 | United Kingdom |

OTHER PUBLICATIONS

Proceedings of the 20th Intersociety Energy Conversion Engineering Conference, Energy for the 21st Century, vol. 2, pp. 2111–2114, (1985), Bindin: "A New Approach to Sodium Sulfur Cell and Battery Design".

*Primary Examiner*—Stephen Kalafut
*Attorney, Agent, or Firm*—Finnegan, Henderson, Farabow, Garrett & Dunner

[57] ABSTRACT

The cathode region of a sodium sulphur cell has hitherto sometimes been sealed by a thin metal member welded at its outer periphery to the metal casing and at its inner periphery to the alpha alumina lid of the electrolyte. The welding operation damages the essential protective coating of the thin metal member. This invention discloses sealing the cathode region with a thin metal member (5) secured to a concentric outer thicker metal member (4), the thin member being sealed to the lid (15) and the thicker member being sealed to the casing (1). The thickness of the outer member eliminates the need for a protective coating so that the combined seal has greater integrity than previous seals.

24 Claims, 3 Drawing Sheets

ALKALI METAL ENERGY CONVERSION DEVICE AND METHOD OF CONSTRUCTION

This invention relates to alkali metal energy conversion devices, such as for example, alkali metal cells and particularly sodium sulphur cells and methods of constructing such devices. Such cells typically employ a solid electrolyte element separating cathodic and anodic reactants which are liquid at the cell operating temperature.

A known construction of such a device comprises an external casing, a solid electrolyte element dividing the interior of the casing into two electrode regions, an electrically insulating element joined to the electrolyte element, and at least one metal member sealed to the insulating element. This structure typically forms part of the sealing arrangement for the device, sealing off the two electrode regions both from each other and from the ambient environment. For example, the external casing of the device may be of metal, so that any sealing of an electrode region requires a seal to be made between the metal of the casing and the electrolyte element. However the metal of the casing must be electrically insulated from the electrolyte element and the insulation is provided by the intervening electrically insulating element.

An example of such an arrangement applied to a sodium sulphur cell is shown in GB-A-2102622 which has an alpha alumina lid closing a tubular electrolyte element. A centrally located current collector is mounted in an aperture through the alpha alumina lid and insulated by the lid from the electrolyte element. The outer electrode region, on the outside of the electrolyte element, is sealed by means of a thin metal closure member welded about its periphery to a metal casing for the cell, and sealed about an inner periphery to the alpha alumina lid. This latter seal between the thin metal closure member and the alpha alumina lid has sometimes been made by compression bonding using an intermediate layer, between the thin metal closure element and the ceramic lid, of a soft material, e.g. aluminium, to provide the necessary bonding.

Such bonding is carried out after the insulating element, i.e. the alpha alumina ceramic lid, as attached to the electrolyte element since this attachment is effected by glazing at elevated temperatures which would destroy seals manufactured by thermocompression bonding using an intermediate layer between the thin metal closure element and the ceramic lid.

Alternatively, EP-A-0166605 discloses the techniques of directly thermocompression bonding the thin metal member to the insulating ceramic lid to provide a seal between the two which is not adversely effected by subsequent temperature cycling such as may be employed if the insulating element is subsequently joined to the electrolyte element by glazing. The ability to form such a seal between the thin metal member and the insulating element before the latter is joined to the electrolyte element greatly facilitates the making of this seal. For instance, a stack of metal members and insulating elements may be simultaneously sealed to one another to provide a plurality of sealed pairs.

It will be appreciated that the sealing of sodium sulphur cells and other alkali metal energy conversion devices is of critical importance in the manufacture of the cell to ensure good performance and safety and is a particularly difficult problem because of the high operating temperatures of these cells, typically 350° C. Bonding techniques using cements have not proved practical.

In particular, the seal to the outer electrode region effected by the welding of the thin metal closure member about its periphery to the metal casing is dependent upon the integrity of a thin film, generally aluminium oxide with the materials commonly used, that is formed on the thin metal member during thermocompression. This thin film protects the metal member from attack by corrosive substances in the outer, i.e. sulphur electrode, region, these in particular being polysulphides formed therein.

Hitherto, the thin metal member has been directly welded to the metal casing after thermocompression sealing of the metal member to the alpha alumina lid. This procedure, however, results in the disruption of the protective aluminium oxide film in the vicinity of the weld due to the heat associated with welding. The generation of polysulphides when the cell is in use will result in the corrosion of the thin metal member and, ultimately, the failure of the seal.

According to the present invention, a method of constructing an alkali metal energy conversion device having an external casing, a solid electrolyte element dividing the interior of the casing into two electrode regions, an electrically insulating element joined to the electrolyte element, at least one first metal member sealed to the insulating element, is characterised by the steps of securing the first metal member to a substantially thicker further metal member and sealing the first metal member to the insulating element by thermocompression bonding, and securing the further metal member to the casing.

Arranging for a substantially thicker metal member to seal to the metal casing results in the protective film on the thin metal member remaining undamaged and thus obviates the problems associated with a vulnerable thin protective film coating the thin metal member used hitherto. The further metal member is, by virtue of its greater thickness, resistant to the corrosive polysulphides and consequently does not require a protective thin film. Furthermore, retaining a thin metal member to seal to the insulating element satisfies the requirement for flexibility in this latter seal to cope with differential heat expansion during thermocompression bonding and subsequent operations of glazing and cell testing.

Also according to the invention there is provided an alkali metal energy conversion device having an external casing, a solid electrolyte element in the casing to divide the interior into two electrode regions, an electrically insulating element joined to the electrolyte element, and a first metal member secured by thermocompression bonding to the insulating element characterised by a substantially thicker further metal member bonded to said first metal member and joined to the external casing to seal off one of said electrode regions.

Figure 2:
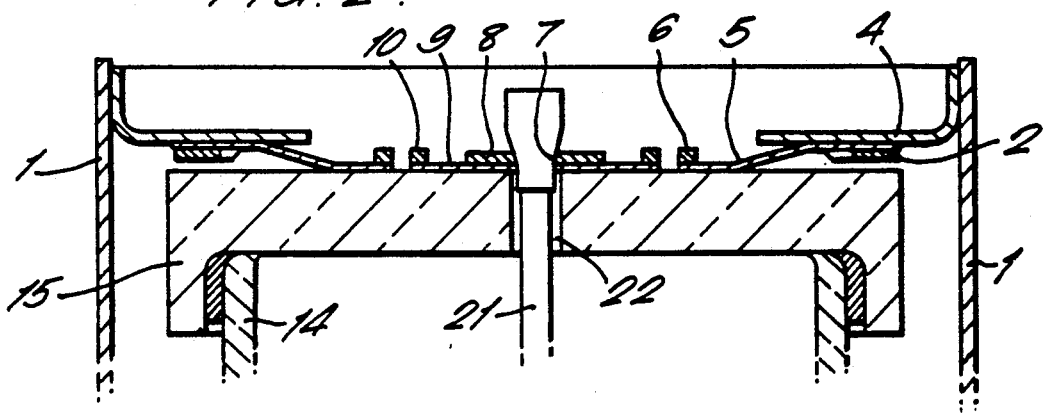
Figure 3:
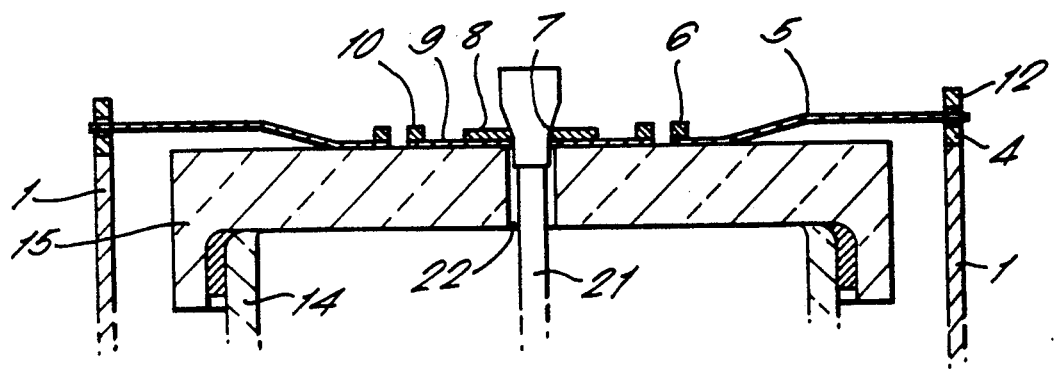
Figure 4:
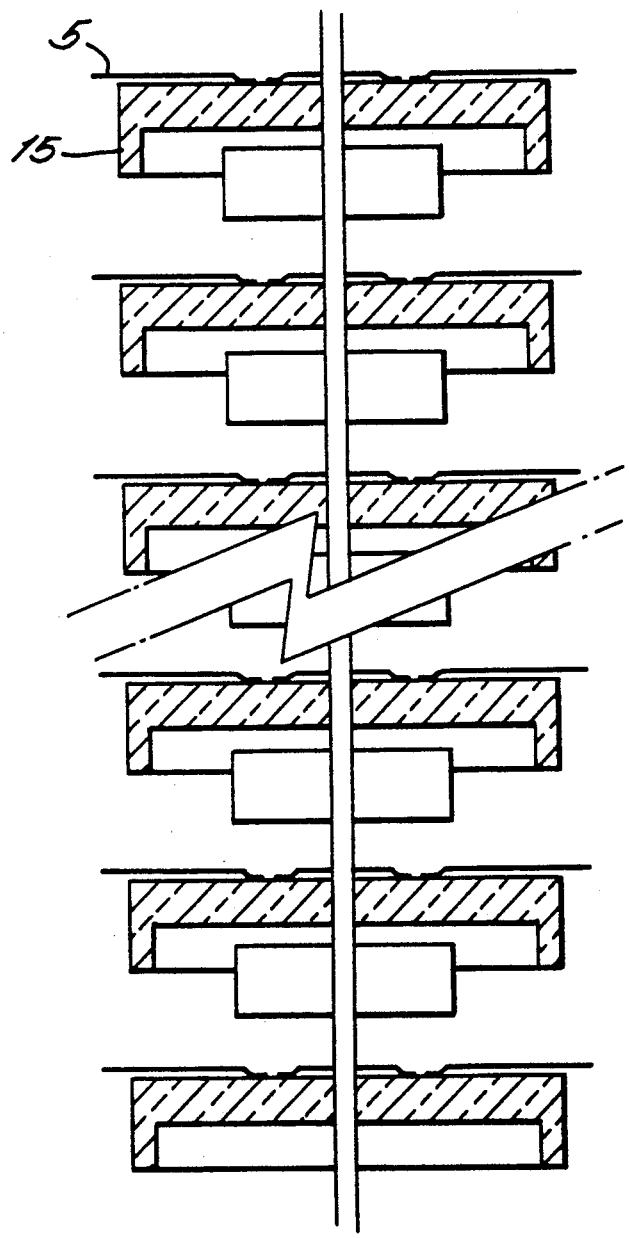

The invention will now be described by way of example with reference to the drawings in which:

FIG. 1 is a diagrammatic longitudinal crosssection through a known sodium sulphur cell; and FIGS. 2 and 3 are each diagrammatic longitudinal cross-sections through an arrangement of a portion of a sodium sulphur cell in accordance with the invention; and FIG. 4 illustrates a plurality of sub-assemblies stacked and produced in accordance with the teachings of the present invention.

Referring to FIG. 1 of the drawings, a sodium sulphur cell of the central sodium type is illustrated comprising a cylindrical beta alumina electrolyte tubular element 14 which is integrally closed at one end as shown at 27 and has its other end closed by an alpha alumina end plate 15. The end plate 15 is sealed, by glazing to one end of the electrolyte element 14 and provides electrical insulation as well as a mechanical seal. Within the sealed assembly there may be either an iron foil element (not shown) or a mesh element (not shown) closely adjacent the inner cylindrical surface of the electrolyte tube 14 to leave a capillary region adjacent that surface constituting a wick. The interior of the assembly is filled with sodium 20 which is liquid at the operating temperature of the cell; the capillary maintains a layer of liquid sodium over the inner surface of the electrolyte tube 14. A current collector rod 21 extends into this sodium, passing through an aperture 22 in the alpha alumina element 15. Around the outside of the cylindrical portion of the electrolyte element 14 is a cathode structure of annular form constituted by three third-cylindrical elements 23 and a further cup shaped base element (not shown) of carbon fibre material impregnated with sulphur. These elements lie between the electrolyte tube 14 and an outer metal case 1, the cathode elements 23 being in contact both with the beta alumina electrolyte tube 14 and the case 1. These cathode elements may be formed in the known way by compression of the fibre material which is impregnated with hot sulphur, the sulphur then being cooled so as to be solidified and thereby to hold the element in compression to facilitate assembly of the cell. When the cell is raised to the operating temperature, typically 350°, the sulphur melts and the resilience of the fibre material causes the elements 23 to make good contact with the case 1 and the electrolyte 14. The case 1 is made preferably of Inconel 600 or chromised mild steel and, on its internal surface, is coated with an anti-corrosive electronically conductive coating 24 to provide an electronically conductive path between the case and the carbon fibre material.

The alpha alumina plate 15 is formed as a disc with a central aperture 22. This disc is sealed to the case 1 by means of an annular metal member 25 formed of Inconel 600 or Fecralloy A which is secured by welding to the periphery of the housing and by thermocompression bonding to the disc 15 in an annular region around the central aperture 22. The central compartment of the cell is closed by means of a current collector 21 passing through the aperture 22 and secured to an inner metal element 9 also bonded to the alpha alumina around the aperture 22 by means of thermocompression bonding. The element 9 is spaced radially inwardly from the annular metal member 25 so that they are electrically insulated from one another by the alpha alumina disc.

In the manufacture of the cell, the metal members 25 and 9 are bonded to the alpha alumina end plate 15 before further assembly of the cell. This bonding is effected by compression at an elevated temperature and under vacuum conditions or in an inert atmosphere. Typical bonding conditions for 0.075 mm (3 thou) thick Fecralloy metal members are:

| | |
|---|---|
| Maximum Bonding Temperature | = 1000° C. |
| Time at Maximum Temperature | = 20 mins |
| Bonding Pressure | = 24.5 Nmm² |

-continued

| | |
|---|---|
| Bonding Chamber Vacuum | = 4 × 10⁻² torr |

The inner metal member 9 is of relatively small radial extent and the seal is effected by applying pressure through a backing washer 10 to seal the outer peripheral edge of inner metal member 9. The material of the washer 10 is such as to become bonded to the member. The outer annular metal member 25 is sealed to the alpha alumina lid over a small annular region around the inner member but slightly spaced therefrom by applying pressure through a further backing washer 11.

A strengthening washer 8 is also thermocompression bonded to the upper surface of the inner metal member, annular sheet 9. The strengthening washer 8 has a thickness greater than the thickness of the member 9 and serves to keep the inner peripheral portion of the sheet 9 substantially rigid. The outer diameter of the washer 8 is substantially less than the diameter of the backing washer 10, corresponding to the position of the seal between the member 9 and the alpha alumina lid 15.

The central current collector 21 extending through the aperture 22 has an annular shoulder 7 which seals against the inner edge of the strengthening washer 8 and is welded thereto to provide the necessary hermetic seal.

Because the annular sheet 9 is bonded to the alpha alumina lid 15 only about the outer periphery of the sheet 9, some flexibility is provided between the seal with the central current collector 21 and the seal to lid 15. The material of the sheet 9 is made sufficiently thin to permit some distortion in the region indicated generally at 26 between the backing washer 10 and the strengthening washer 8.

Using this technique, a plurality of sub-assemblies comprising the end plates 15 with their metal members can be stacked and produced in a single operation.

The present invention is more particularly concerned with the sealing of the outer of the electrode regions, i.e. that lying between the electrolyte tube 14 and the outer metal case 1.

Turning now to FIG. 2 in which reference numerals used hitherto refer to like integers, a first metal member 5 is shown secured to a substantially thicker further metal member 4.

The first metal member 5, which may be essentially annular, is secured to the alpha alumina ceramic lid 15 at a narrow region at its inner periphery, bonding pressure being applied through an annular metal washer 6 of a material which becomes bonded to said first metal member 5. An interface washer 2 is provided to sandwich the first metal member 5 in between said interface washer and the further metal member 4, an electron beam weld securing the first metal member in position. Generally, Fecralloy is used for the first metal member 5, Inconel for the further metal member 4 and the interface washer 2 and Nilo K for the backing washer. Preferably, the first metal member 5 is welded to the further metal member to provide a sub-assembly which is subsequently secured to the ceramic lid 15 by thermocompression bonding. Finally, the further metal member 4 is electron beam welded to the metal case 1 to provide a seal to the outer electrode region.

The electron beam welding referred to herein may be replaced, in practise, by any other low energy welding technique such as laser welding or micro-pulsed TIG.

The geometry of this seal is such that the abutting portions provide a joint which is essentially self-jigging. Consequently, the electron beam welding process is facilitated, allowing a high welding yield.

Referring now to FIG. 3, the substantially thicker further member 4 is formed as an annular member. Preferably, the first metal member 5 is sandwiched, at its outer periphery, between a further annular member 12 and the said substantially thicker further member 4, and is secured thereto by electron beam welding. Subsequently, the first metal member is secured to the ceramic lid 15 by the earlier described thermocompression bonding process. The annular member 4 is finally secured to the metal casing 1 by electron beam welding to provide a seal to the outer electrode region. Conveniently, the annular members 4 and 12 may be rings slit from a tube, thus allowing efficient material usage. An advantage of the method of the present invention will now be described with reference to FIG. 5. Using this technique, a plurality of sub-assemblies comprising end plates 15 with their metal members 5 can be stacked and produced in a single operation.

Conveniently, it may be arranged for any of the embodiments previously described that a plurality of first metal members are bonded to respective insulating ceramic elements simultaneously by stacking first metal members and said insulating elements applying bonding pressure and heat to the stack.

We claim:

1. A method of constructing an alkali metal energy conversion device having an external casing, a solid electrolyte element dividing an interior of the casing into two electrode regions, an electrically insulating element jointed to the electrolyte element, and at least one first metal member sealed to the insulating element, the method comprising the steps of securing the first metal member to a substantially thicker further metal member, sealing the first metal member to the insulating element by thermocompression bonding, and securing the further metal member to the casing for sealing off one of said electrode regions, the first metal member being adapted to provide sufficient flexibility to the seal formed between said first metal member and the insulating element to cope with differential heat expansion during formation and operation of the device.

2. A method as claimed in claim 1, characterised in that a second metal member is secured to the first metal member, a portion of said first metal member being between said second metal member and said substantially thicker metal member.

3. A method as claimed in claim 1, characterised in that the first metal member is secured directly to the insulating element by thermocompression bonding before joining the insulating element to the electrolyte element.

4. A method as claimed in claim 1, characterised in that a plurality of first metal members are bonded to respective insulating elements simultaneously by stacking said first metal members and said insulating elements and applying bonding pressure and heat to the stack.

5. A method as claimed in claim 1, characterised in that the first metal member is annular having a central opening through which extends, insulatingly spaced from the first metal member, a current collector.

6. A method as claimed in claim 5, characterised in that the first annular metal member is secured by thermocompression bonding to the insulating element over a narrow region at an inner periphery of the first annular metal member.

7. A method as claimed in claim 5, characterised in that a pressure to produce thermocompression bonding is applied through an annular metal washer of a material which becomes bonded to said first annular metal member.

8. A method as claimed in claim 5, characterised in that after the first annular metal member has been secured to the insulating element and the electrolyte element has subsequently been joined to the insulating element, the external casing is welded around a periphery at one end to seal an outer one of said two electrode regions.

9. A method as claimed in claim 5, characterised in that the insulating element is a disc shaped ceramic lid for a tubular electrolyte element and an inner metal element is secured to the insulating element by thermocompression bonding to provide a metal element for sealing around a current collector which is subsequently inserted through the inner metal element and through an aperture in the insulating element.

10. A method as claimed in claim 9, characterised in that the inner metal element is bonded to the insulating element at the same time as the first metal member.

11. A method as claimed in claim 9, characterised in that a pressure to produce thermocompression bonding of said inner metal element to the insulating element is supplied through an annular metal backing element of a material which becomes bonded to said inner metal element.

12. A method as claimed in claim 9, characterised in that said inner metal element is formed as a flat annular sheet having an outer diameter which is less than an inner diameter of said first metal member, the inner metal element being thermocompression bonded to the insulating member about an outer periphery only.

13. A method as claimed in claim 12, characterised in that a metal strengthening washer is bonded to the inner metal element adjacent an inner periphery, an outer diameter of the washer being less than the diameter at which the inner metal element is sealed to the insulating member, the current collector being sealed in electrical connection to the washer.

14. A method as claimed in any one of claims 1–13, characterised in that the insulating element is formed of alpha alumina and the electrolyte element is formed of beta alumina.

15. An alkali metal energy conversion device, comprising an external casing, a solid electrolyte element in the casing to divide an interior into two electrode regions, an electrically insulating element joined to the electrolyte element, a first metal member thermocompression bonded to the insulating element, and a substantially thicker further metal member bonded to said first metal member and joined to the external casing, the first metal member and the further metal member sealing off one of said electrode regions, the first metal member being adapted to provide sufficient flexibility to the seal formed between said first metal member and the insulating element to cope with deferential heat expansion during formation and operation of the device.

16. A device as claimed in claim 15, characterised by a second metal member secured to the first metal member, a portion of said first metal member being between said second metal member and said substantially thicker metal member.

17. A device as claimed in claim 15, characterised in that the external casing is cylindrical, the electrolyte element is tubular and the first metal member is annular having a central opening through which extends, insulatingly spaced from the first metal member, a current collector.

18. A device as claimed in claim 17, characterised in that the first metal member is secured by thermocompression bonding to the insulating element in a narrow region at an inner periphery of the first metal member.

19. A device as claimed in claim 18, characterised in that the first metal member is sandwiched between a metal backing washer and the insulating element, being thermocompression bonded to both in an annular region.

20. A device as claimed in claim 17, characterised in that the insulating element is a disc shaped ceramic lid for the tubular electrolyte element and there is an inner metal element secured to the insulating element by thermocompression bonding to provide a metal element for sealing around a current collector.

21. A device as claimed in claim 20, characterised in that the inner metal element is sandwiched between an annular metal backing element and the insulating member, being thermocompression bonded to both in an annular region.

22. A device as claimed in claim 20, characterised in that said inner metal element is formed as a flat annular sheet having an outer diameter which is less than an inner diameter of the first metal member and the inner metal element is thermocompression bonded to the insulating member about an outer periphery only.

23. A device as claimed in claim 22, characterised by a metal strengthening washer bonded to the inner metal element adjacent an inner periphery, an outer diameter of the washer being less than a diameter at which the inner metal element is sealed to the insulating member being sealed in electrical connection to the washer.

24. A device as claimed in any one of claimed 15 to 23, characterised in that the first metal member and/or the further metal member are formed of an iron based or nickel based alloy resistant to chemical attack by sodium and/or sulphur/sodium polysulphides.

* * * * *

UNITED STATES PATENT AND TRADEMARK OFFICE
CERTIFICATE OF CORRECTION

PATENT NO. : 5,118,574

DATED : June 2, 1992

INVENTOR(S) : Peter John Bindin et al.

It is certified that error appears in the above-identified patent and that said Letters Patent is hereby corrected as shown below:

Claim 1, column 5, line 34, "jointed" should read --joined--.

Signed and Sealed this

Thirteenth Day of July, 1993

Attest:

MICHAEL K. KIRK

*Attesting Officer*  *Acting Commissioner of Patents and Trademarks*